(12) United States Patent
Robson et al.

(10) Patent No.: US 7,449,030 B2
(45) Date of Patent: Nov. 11, 2008

(54) AGGLOMERATION OF ALUMINA AND BINDER THEREFOR

(75) Inventors: Barry James Robson, Perth (AU); Ronald Gallagher, Atwell (AU)

(73) Assignee: Alcoa World Alumina LLC, Pittsburgh, PA (US)

( * ) Notice: Subject to any disclaimer, the term of this patent is extended or adjusted under 35 U.S.C. 154(b) by 840 days.

(21) Appl. No.: 10/971,639

(22) Filed: Oct. 20, 2004

(65) Prior Publication Data

US 2005/0118096 A1    Jun. 2, 2005

Related U.S. Application Data

(63) Continuation-in-part of application No. 09/895,544, filed on Jun. 29, 2001, now abandoned.

(30) Foreign Application Priority Data

Mar. 1, 2001  (WO) .................... PCT/AU01/00213
Mar. 1, 2001  (WO) .................... PCT/AU01/00214

(51) Int. Cl.
  *C05B 19/00*    (2006.01)
(52) U.S. Cl. .................................... 23/313 R
(58) Field of Classification Search ............... 23/313 R; 423/625; 502/127
  See application file for complete search history.

*Primary Examiner*—Edward M Johnson
(74) *Attorney, Agent, or Firm*—Greenberg Traurig LLP

(57) ABSTRACT

A method for the agglomeration of alumina particles, the method comprising the steps of comminuting a plurality of alumina particles having a soda content of less than approximately 0.4% by weight to a $D_{50}$ of less than 12 μm, adding a quantity of pseudo-boehmite as an aqueous suspension having a pH of from about 2 to 6 to the plurality of alumina particles to form a mixture such that the quantity of pseudo-boehmite is between about 0.8 wt % and 5 wt % based on weight of the mixture, and spray drying the mixture to produce agglomerated granules.

72 Claims, No Drawings

AGGLOMERATION OF ALUMINA AND BINDER THEREFOR

CROSS REFERENCE TO RELATED APPLICATIONS

This is a continuation-in-part of U.S. patent application Ser. No. 09/895,544 filed on Jun. 29, 2001 now abandoned, which in turn claimed the benefit of PCT International Application No. AU01/00213 that had an international filing date of 1 Mar. 2001, said PCT having designated the United States of America.

FIELD OF THE INVENTION

The present invention relates to a method for the agglomeration of particles of alumina, or particles containing a substantial portion of alumina, and a binder for use in such.

BACKGROUND OF THE INVENTION

In the Bayer process for the extraction of alumina from alumina containing ores, precipitated alumina tri-hydrate is filtered, dried and calcined. This yields high purity alumina with a narrow range of particle sizes. However, a by-product of the calcination process is extremely fine particles of alumina, with an average size of less than 30 μm. This by-product is caught in the gas cleaning devices, including multi-cyclones, electrostatic precipitators and/or bag-houses, attached to the calcination device. Such particles are commonly known as ESP dust. In addition to being difficult to handle, ESP dust is difficult to reintroduce into the process stream, not being readily redigested in the highly caustic solution of the digestion phase.

Accordingly, it is desirable to be able to agglomerate small particles of alumina, such as ESP dust, to form coarser particles. Ideally, these coarser particles are of a size range suitable for use in aluminium smelting.

In the ceramics industry, particles are agglomerated by spray drying using organic polymers as binders. However, the agglomerates formed by these methods are typically weakly bonded and they are readily degraded when handled or transported.

In Australian Patent 664328, there is provided a method for agglomerating alumina particles with a binder comprising a polymer form of a hydroxy salt of aluminium. In a variant of the invention, activated alumina is used to reduce the quantities of the binding agent required. The activated alumina is believed to enhance binding by forming a film of pseudo boehmite that adheres to the particles of unactivated alumina powder. However, it is clearly stated that the activated alumina cannot be used alone to achieve beneficial agglomeration of the alumina particles.

However the cost of the binding agent, and that associated with the production of activated alumina, have prevented the widespread application of this method. It is one object of the present invention to provide a method for the agglomeration of particles of alumina, or particles comprising alumina, where the quantity of binder required is substantially reduced, and the need for activated alumina eliminated.

The preceding discussion of the background to the invention is intended to facilitate an understanding of the present invention. However, it should be appreciated that the discussion is not an acknowledgement or admission that any of the material referred to was part of the common general knowledge in Australia as at the priority date of the application.

Throughout the specification, unless the context requires otherwise, the word "alumina" will be understood to encompass fully dehydrated alumina, fully hydrated alumina, partially hydrated alumina or a mixture of these forms.

Throughout the specification, unless the context requires otherwise, the term "alumina particles" will be understood to include particles of an alumina containing material where the alumina content of said particles is at least about 30% by weight $Al_2O_3$.

Further, throughout the specification, unless the context requires otherwise, the word "comprise" or variations such as "comprises" or "comprising", will be understood to imply the inclusion of a stated integer or group of integers but not the exclusion of any other integer or group of integers.

SUMMARY OF THE INVENTION

In accordance with the present invention, there is provided a method for the agglomeration of alumina particles, the method comprising the steps of: comminuting a plurality of alumina particles having a soda content of less than approximately 0.4% by weight to a $D_{50}$ of less than 12 μm; adding a quantity of pseudo-boehmite as an aqueous suspension having a pH of from about 2 to 6 to said plurality of alumina particles to form a mixture such that the quantity of pseudo-boehmite is between about 0.8 wt % and 5 wt % based on weight of said mixture; and spray drying said mixture to produce agglomerated granules.

Another method for the agglomeration of alumina particles comprises the steps of: adding a quantity of water to a plurality of alumina particles having a soda content of less than approximately 0.4% by weight to form a slurry; grinding said alumina particles in said slurry to a $D_{50}$ of less than 12 μm; adding a quantity of pseudo-boehmite as an aqueous suspension having a pH of from about 2 to 6 to said slurry to form a mixture such that the quantity of said pseudo-boehmite is between about 0.8 wt % and 5 wt % based on weight of said mixture; adding a viscosity modifier to said slurry, said mixture or said aqueous suspension such that the viscosity of said mixture is less than about 4 cp; and spray drying said mixture to produce agglomerated granules.

Another method for the agglomeration of alumina particles comprises the steps of: grinding a plurality of alumina particles having a soda content of less than approximately 0.4% by weight to a $D_{50}$ of less than 12 μm; adding a quantity of water to said alumina particles to form a slurry; adding a quantity of pseudo-boehmite as an aqueous suspension having a pH of from about 2 to 6 to said slurry to form a mixture such that the quantity of said pseudo-boehmite is between about 0.8 wt % and 5 wt % based on weight of said mixture; and adding a viscosity modifier to said slurry, said mixture or said aqueous suspension such that the viscosity of said mixture is less than about 4 cp; spray drying said mixture to produce agglomerated granules.

A $D_{50}$ of less than 12 μm means that 50% of the alumina particles have a diameter less than 12 micrometers. Preferably, a $D_{50}$ of less than 12 μm will have approximately 99% of the alumina particles having a diameter of less than about 12 micrometers.

Preferably, the pseudo-boehmite is added as an aqueous suspension.

Preferably, the aqueous suspension of pseudo-boehmite is formed at a temperature between about 15 and 100° C. Preferably still, the aqueous suspension of pseudo-boehmite is formed at a temperature above about 80° C. In a highly preferred form of the invention, the aqueous suspension of pseudo-boehmite is formed at a temperature above about 85° C.

Preferably, a quantity of acid is added to the aqueous suspension of pseudo-boehmite such that the pH of such is between about 2 and 6. Advantageously, a quantity of acid is added to the aqueous suspension of pseudo-boehmite such that the pH of such is approximately 3. Preferably, the acid is monoprotic. In a highly preferred form of the invention, the acid is acetic acid.

Preferably, before the step of adding a quantity of pseudo-boehmite to the alumina particles, the present invention comprises the step of comminuting the alumina particles to a $D_{50}$ of less than 12 µm. Preferably, the alumina particles are comminuted to a $D_{50}$ of less than about 9 µm. In a highly preferred form of the invention, the alumina particles are comminuted to a $D_{50}$ of about 5 µm.

The alumina particles may be comminuted by jet milling or by grinding means involving ceramic or metal grinding media including ball milling and bead milling.

In one form of the invention, a quantity of water is added to the alumina particles to form a slurry, the slurry then being subjected to grinding.

In an alternate form of the invention, the alumina particles are subjected to dry grinding before a quantity of water is added to form a slurry. Where the alumina particles are subjected to dry grinding before a quantity of water is added to form a slurry, the quantity of water may be provided by way of the aqueous suspension of pseudo-boehmite.

Preferably, the slurry is of as high a density as possible. Preferably still the slurry comprises at least 50% solids. Typically, the slurry comprises between about 40 and 60% solids.

The slurry may also contain a viscosity modifier. The viscosity modifier may be one or more of acetic acid, citric acid or a polyacrylate. Preferably, sufficient viscosity modifier is added such that the viscosity of the slurry is less than about 4 cp. In a preferred form of the invention, the viscosity modifier is acetic acid. In a highly preferred form of the invention, sufficient acetic acid is introduced such that the concentration of the acetic acid in the slurry is between about 0.2 and 1.5% by weight of the alumina particles.

Preferably, before the quantity of pseudo-boehmite is added to the alumina particles, the method comprises the additional steps of: neutralizing, dewatering and washing the alumina particles.

In one form of the invention, dewatering is achieved by way of filtration. In an alternate form of the invention, dewatering may be achieved by way of centrifugation. Preferably, carbon dioxide is used to neutralize the alumina particles.

The step of neutralizing, dewatering and washing the alumina particles may be carried out before or after grinding the alumina particles. Conveniently, the step of neutralizing, dewatering and washing the alumina particles is carried out before the step grinding the alumina particles as a smaller filter may be used.

The method of the present invention may comprise the additional step of:
heating the agglomerated granules.

In one form of the invention, the agglomerated particles are dehydroxylated by heating to approximately 300° C. In an alternate form of the invention, the agglomerated granules are calcined above 500° C.

DESCRIPTION OF THE PREFERRED EMBODIMENTS

The method of the present invention will subsequently be described, by way of example only, with reference to one embodiment thereof and several examples.

In the embodiment, a quantity of water is added to particulate alumina to form a slurry of a density between about 40 and 60% solids. A viscosity modifier, in the form of acetic acid is added to the slurry such that the concentration of acetic acid in the slurry is between about 0.2 and 1.5% by weight of the alumina particles.

The slurry is then subjected to grinding such that the alumina particles are ground to a $D_{50}$ of less than 12 µm and preferably about 5 µm.

A quantity of binding agent in the form of an aqueous suspension of pseudo boehmite is added to the slurry.

The aqueous suspension of pseudoboehmite is formed at a temperature above about 80° C., and preferably above about 85° C. A quantity of monoprotic acid, preferably acetic acid, is added to the aqueous suspension of pseudo boehmite such that the pH is about 3.0.

The mixture formed by the addition of the aqueous suspension of pseudo boehmite to the slurry is then spray dried to produce agglomerated granules.

The agglomerated granules may then be heated to in excess of approximately 300° C. to effect dehydroxylation of such, or in excess of approximately above 500° C. to effect calcination of such.

The present invention will now be described by way of several examples. However, it must be appreciated that the following description of those examples is not to limit the generality of the above description of the invention.

EXAMPLE 1

One kilogram of alumina particles with a $D_{50}$ of 15.3 µm was added to 1200 mL of water to form a slurry. Carbon dioxide gas was bubbled through the slurry until the pH of such was about 6.5. Glacial acetic acid (5 g) was added to the slurry, which was then heated to 85° C.

A quantity of a pseudo-boehmite suspension was added to the slurry. The pseudo-boehmite suspension was prepared by the dispersion of 50 g of a commercial pseudo-boehmite (either Catapal B (supplied by Vista Condea) or HiQ X (supplied by Alcoa World Chemicals)) in 200 g of 85° C. water. After the mix returned to 85° C., 5 g of glacial acetic acid was added.

After mixing for several minutes the slurry to which the pseudo-boehmite suspension was added was then spray dried. Throughout the spray drying the off gas temperature was maintained at 180° C. Portions of the product were calcined at 500° C. in a muffle furnace for one hour.

EXAMPLE 2

One kilogram of alumina particles with a $D_{50}$ of 15.3 µm was added to 1200 mL of water to form a slurry. Carbon dioxide gas was bubbled through the slurry until the pH of such was about 6.5. The slurry was filtered and washed with a further 500 mL of water. The filter cake was then re-slurried in sufficient water to produce a slurry containing 50% solids. Glacial acetic acid (5 g) was added to the final slurry, which was then heated to 85° C.

A quantity of a pseudo-boehmite suspension was added to the slurry. The pseudo-boehmite suspension was prepared by the dispersion 50 g of a commercial pseudo-boehmite (either Catapal B (supplied by Vista Condea) or HiQ X (supplied by Alcoa World Chemicals)) in 200 g of 85° C. water. After the mix returned to 85° C., 5 g of glacial acetic acid was added.

After mixing for several minutes the slurry to which the pseudo-boehmite suspension was added was then spray dried. Throughout the spray drying the off gas temperature was maintained at 180° C. Portions of the product were calcined at 500° C. in a muffle furnace for one hour.

EXAMPLE 3

One kilogram of alumina particles with a $D_{50}$ of 15.3 µm was added to 1200 mL of water to form a slurry. Carbon dioxide gas was bubbled through the slurry until the pH of such was about 6.5. The slurry was filtered and washed with a further 500 mL of water. The filter cake was then re-slurried in sufficient water to produce a slurry containing 50% solids. Glacial acetic acid (5 g) was added to the final slurry, which was then heated to 85° C.

A quantity of a pseudo-boehmite suspension was added to the slurry. The pseudo-boehmite suspension was prepared by the dispersion 20 gm of a commercial pseudo-boehmite (either Catapal B (supplied by Vista Condea) or HiQ X (supplied by Alcoa World Chemicals)) in 200 g of 85° C. water. After the mix returned to 85° C., 5 g of glacial acetic acid was added.

After mixing for several minutes the slurry to which the pseudo-boehmite suspension was added was then spray dried. Throughout the spray drying the off gas temperature was maintained at 180° C. Portions of the product were calcined at 500° C. in a muffle furnace for one hour.

EXAMPLE 4

Alumina particles with a $D_{50}$ of 15.3 µm were slurried in water. Carbon dioxide gas was bubbled through the slurry until the pH of such was about 6.5. The slurry was filtered and washed with a further 500 mL of water, then dried. The powder was then dry ground in a Jet Mill. One kilogram of the ground alumina particles was added to 800 mL of water to form a slurry. Glacial acetic acid (5 g) was added to the final slurry, which was then heated to 85° C.

A quantity of a pseudo-boehmite suspension was added to the slurry. The pseudo-boehmite suspension was prepared by the dispersion 10 gm of a commercial pseudo-boehmite (either Catapal B (supplied by Vista Condea) or HiQ X (supplied by Alcoa World Chemicals)) in 200 g of 85° C. water. After the mix returned to 85° C. 5 g of glacial acetic acid was added.

After mixing for several minutes the slurry to which the pseudo-boehmite suspension was added was then spray dried. Throughout the spray drying the off gas temperature was maintained at 180° C. Portions of the product were calcined at 500° C. in a muffle furnace for one hour.

EXAMPLE 5

Alumina particles with a $D_{50}$ of 15.3 µm were slurried in water. Carbon dioxide gas was bubbled through the slurry until the pH of such was about 6.5. The slurry was filtered and washed with a further 500 mL of water, then dried. The powder was then dry ground in a Jet Mill. One kilogram of the ground alumina particles was added to 620 mL of water to form a slurry. Glacial acetic acid (4.4 g) was added to the final slurry, which was then heated to 85° C.

A quantity of a pseudo-boehmite suspension was added to the slurry. The pseudo-boehmite suspension was prepared by the dispersion 10 gm of a commercial pseudo-boehmite (either Catapal B (supplied by Vista Condea) or HiQ X (supplied by Alcoa World Chemicals)) in 200 g of 85° C. water. After the mix returned to 85° C., 0.7 g of glacial acetic acid was added.

After mixing for several minutes the slurry to which the pseudo-boehmite suspension was added was then spray dried. Throughout the spray drying the off gas temperature was maintained at 180° C. Portions of the product were calcined at 500° C. in a muffle furnace for one hour.

EXAMPLE 6

Alumina particles with a $D_{50}$ of 15.3 µm were slurried in water. Carbon dioxide gas was bubbled through the slurry until the pH of such was about 6.5. The slurry was filtered and washed with a further 500 mL of water, then dried. The powder was then dry ground in a Jet Mill. One kilogram of the ground alumina particles was added to 800 mL of water to form a slurry. Glacial acetic acid (5 g) was added to the final slurry, which was then heated to 85° C.

A quantity of a pseudo-boehmite suspension was added to the slurry. The pseudo-boehmite suspension was prepared by the dispersion 20 gm of a commercial pseudo-boehmite (either Catapal B (supplied by Vista Condea) or HiQ X (supplied by Alcoa World Chemicals)) in 200 g of 85° C. water. After the mix returned to 85° C., 5 g of glacial acetic acid was added.

After mixing for several minutes the slurry to which the pseudo-boehmite suspension was added was then spray dried. Throughout the spray drying the off gas temperature was maintained at 180° C. Portions of the product were calcined at 500° C. in a muffle furnace for one hour.

EXAMPLE 7

One kilogram of alumina particles with a $D_{50}$ of 15.3 µm was added to 800 mL of water to form a slurry. Carbon dioxide gas was bubbled through the slurry until the pH of such was about 6.5. Glacial acetic acid (5 g) was added to the slurry, which was then heated to 85° C. This slurry was ground for 30 minutes in a laboratory jar mill.

A quantity of a pseudo-boehmite suspension was added to the slurry. The pseudo-boehmite suspension was prepared by the dispersion 20 gm of a commercial pseudo-boehmite (either Catapal B (supplied by Vista Condea) or HiQ X (supplied by Alcoa World Chemicals)) in 200 g of 85° C. water. After the mix returned to 85° C., 5 g of glacial acetic acid was added.

After mixing for several minutes the slurry to which the pseudo-boehmite suspension was added were then spray dried. Throughout the spray drying the off gas temperature was maintained at 180° C. Portions of the product were calcined at 500° C. in a muffle furnace for one hour.

EXAMPLE 8

One kilogram of alumina particles with a $D_{50}$ of 15.3 µm was added to 1200 mL of water to form a slurry. Carbon dioxide gas was bubbled through the slurry until the pH of such was about 6.5. The slurry was filtered and deliquored. The filter cake was then reslurried in sufficient water to produce a slurry containing 50% solids. Glacial acetic acid (5 g) was added to the final slurry, which was then heated to 85° C. This slurry was ground for 30 minutes in a laboratory jar mill.

A quantity of a pseudo-boehmite suspension was added to the slurry. The pseudo-boehmite suspension was prepared by the dispersion 20 gm of a commercial pseudo-boehmite (either Catapal B (supplied by Vista Condea) or HiQ X (supplied by Alcoa World Chemicals)) in 200 g of 85° C. water. After the mix returned to 85° C. 5 g of glacial acetic acid was added.

After mixing for several minutes the slurry to which the pseudo-boehmite suspension was added was then spray dried. Throughout the spray drying the off gas temperature was maintained at 180° C. Portions of the product were calcined at 500° C. in a muffle furnace for one hour.

EXAMPLE 9

One kilogram of alumina particles with a $D_{50}$ of 15.3 μm was added to 1200 mL of water to form a slurry. Carbon dioxide gas was bubbled through the slurry until the pH of such was about 6.5. The slurry was filtered and washed with a further 500 mL of water. The filter cake was then reslurried in sufficient water to produce a slurry containing 50% solids. Glacial acetic acid (5 g) was added to the slurry, which was then heated to 85° C. This slurry was ground for 30 minutes in a laboratory jar mill.

A quantity of a pseudo-boehmite suspension was added to the slurry. The pseudo-boehmite suspension was prepared by the dispersion 8 gm of a commercial pseudo-boehmite (either Catapal B (supplied by Vista Condea) or HiQ X (supplied by Alcoa World Chemicals)) in 200 g of 85° C. water. After the mix returned to 85° C. 5 g of glacial acetic acid was added.

After mixing for several minutes the slurry to which the pseudo-boehmite suspension was added was then spray dried. Throughout the spray drying the off gas temperature was maintained at 180° C. Portions of the product were calcined at 500° C. in a muffle furnace for one hour.

EXAMPLE 10

Alumina particles with a $D_{50}$ of 15.3 μm were slurried in water. Carbon dioxide gas was bubbled through the slurry until the pH of such was about 6.5. The slurry was filtered and washed with a further 500 mL of water, then dried. The powder was then dry ground in a Jet Mill. One kilogram of the ground alumina particles was added to 800 mL of water to form a slurry. Glacial acetic acid (5 g) was added to the final slurry.

A quantity of a pseudo-boehmite suspension was added to the slurry. The pseudo-boehmite suspension was prepared by the dispersion 40 gm of a commercial pseudo-boehmite (either Catapal B (supplied by Vista Condea) or HiQ X (supplied by Alcoa World Chemicals)) in 200 g of water at room temperature. 5 g of glacial acetic acid was added to this mix.

After mixing for several minutes the slurry to which the pseudo-boehmite suspension was added was then spray dried. Throughout the spray drying the off gas temperature was maintained at 180° C. Portions of the product were calcined at 500° C. in a muffle furnace for one hour.

EXAMPLE 11

Alumina particles with a $D_{50}$ of 15.3 μm were slurried in water. Carbon dioxide gas was bubbled through the slurry until the pH of such was about 6.5. The slurry was filtered and washed with a further 500 mL of water, then dried. The powder was then dry ground in a Jet Mill. One kilogram of the ground alumina particles was added to 800 mL of water to form a slurry. Glacial acetic acid (5 g) was added to the final slurry.

A quantity of a pseudo-boehmite suspension was added to the slurry. The pseudo-boehmite suspension was prepared by the dispersion 20 gm of a commercial pseudo-boehmite (either Catapal B (supplied by Vista Condea) or HiQ X (supplied by Alcoa World Chemicals)) in 200 g of water. 5 g of glacial acetic acid was added to the mix.

After mixing for several minutes the slurry to which the pseudo-boehmite suspension was added was then spray dried. Throughout the spray drying the off gas temperature was maintained at 180° C. Portions of the product were calcined at 500° C. in a muffle furnace for one hour.

A summary of the test conditions for Examples 1 to 11 appears in Table 1, below.

TABLE 1

| Example | Dust D50 (μm) | Filtered | Washed | How Milled | SD Feed D50 (μm) | Binder (%) | Peptise T, (° C.) |
|---|---|---|---|---|---|---|---|
| 1 | 15.3 | No | No | No | 15.3 | 5 | 85 |
| 2 | 15.3 | Yes | Yes | No | 15.3 | 5 | 85 |
| 3 | 15.3 | Yes | Yes | No | 15.3 | 2 | 85 |
| 4 | 15.3 | Yes | Yes | Dry | 4.6 | 1.0 | 85 |
| 5 | 15.3 | yes | yes | Dry | 4.6 | 1.0 | 85 |
| 6 | 15.3 | Yes | Yes | Dry | 4.6 | 2.0 | 85 |
| 7 | 15.3 | No | No | Wet | 5.0 | 2.0 | 85 |
| 8 | 15.3 | Yes | No | Wet | 5.3 | 2.0 | 85 |
| 9 | 15.3 | Yes | Yes | Wet | 5.4 | 0.8 | 85 |
| 10 | 15.3 | Yes | Yes | Dry | 4.6 | 4.0 | 20 |
| 11 | 15.3 | Yes | Yes | Dry | 4.6 | 2.0 | 20 |

Product samples were analyzed for soda ($Na_2O$) content so as to distinguish the effect of washing the feed dust, as it was suspected that soda content may adversely affect boehmitic gel formation. The results of the soda content analyses of the agglomerates appear in Table 2, below

TABLE 2

| | Example | | | | | |
|---|---|---|---|---|---|---|
| | 1 | 2, 3 | 4, 5, 6, 10, 11 | 7 | 8 | 9 |
| % soda | 0.78 | 0.33 | 0.27 | 0.77 | 0.30 | 0.33 |

Samples of the micro agglomerates were analyzed for particle size distribution. The results of the particle size distribution analysis are given in Table 3, below. For comparative purposes the size analysis of regular smelting grade alumina (SGA) is also included.

TABLE 3

| | Cumulative percent passing size | | | | | | |
|---|---|---|---|---|---|---|---|
| | 1000 μm | 300 μm | 212 μm | 150 μm | 106 μm | 75 μm | 53 μm |
| Example 1 | 100 | 79.8 | 54.4 | 35.5 | 21.4 | 16.3 | 13.7 |
| Example 2 | 100 | 84.2 | 61.2 | 36.7 | 15.5 | 5.7 | 2.1 |
| Example 3 | 100 | 82.7 | 58.3 | 34.0 | 13.6 | 4.6 | 1.4 |

TABLE 3-continued

| | Cumulative percent passing size | | | | | |
|---|---|---|---|---|---|---|
| | 1000 μm | 300 μm | 212 μm | 150 μm | 106 μm | 75 μm | 53 μm |
| Example 4 | 100 | 85.5 | 58.3 | 32.3 | 12.9 | 3.9 | 1.0 |
| Example 5 | 100 | 87.4 | 69.5 | 47.7 | 24.0 | 9.0 | 2.6 |
| Example 6 | 100 | 83.0 | 51.8 | 27.8 | 10.9 | 3.9 | 1.4 |
| Example 7 | 100 | 63.1 | 33.8 | 16.7 | 6.8 | 4.2 | 3.5 |
| Example 8 | 100 | 77.7 | 49.2 | 27.7 | 10.6 | 2.4 | 0.3 |
| Example 9 | 100 | 91.2 | 72.2 | 48.1 | 24.6 | 9.5 | 2.8 |
| Example 10 | 100 | 89.9 | 62.4 | 37.6 | 16.6 | 5.7 | 1.7 |
| Example 11 | 100 | 92.3 | 67.7 | 38.0 | 16.1 | 5.9 | 1.9 |
| SGA1 | 100 | 99.9 | 99.7 | 95.3 | 70.1 | 34.8 | 13.8 |
| SGA2 | 100 | 100 | 100 | 94.4 | 42.7 | 15.0 | 4.8 |

In all cases the micro agglomerates formed are of a size slightly coarser than smelting grade alumina, but which is acceptable for the end use.

The micro agglomerates were also tested for strength using an attrition test wherein 25 g of micro agglomerate was placed on the top screen in a stack on a RoTap shaker, and the shaker was activated for 5 minutes. A separate sample was placed on the shaker for 20 minutes. The difference in particle size distribution was used as a comparative breakage test for the samples. The results were compared to a sample of smelting grade alumina. The results of this testing are given in Tables 4 and 5. Table 4, below, shows the results of the attrition testing conducted on the discharge from the spray dryer.

On the basis of these results it was determined that the product of examples 1, 3 and 7 had unsatisfactory attrition resistance and no further testing was conducted. The attrition test results of the paired Examples 1 and 2 and also 7 and 8 suggest that the soluble soda levels of the alumina dust must be reduced before this pseudo-boehmite binding system can be effectively applied. Apparently the presence of soluble salts interferes with the peptisation of the pseudo-boehmite. Therefore, a soda content of less than 0.4% by weight would be preferable since the pseudo-boehmite binder only precipitates in acidic conditions.

A comparison of examples 2 and 3 with examples 6 and 8 show that to produce attrition resistant product a higher binder level (5% for example 2, 2% in examples 3, and 6) is required with coarser dusts.

TABLE 4

| | Screen size | | | | | | |
|---|---|---|---|---|---|---|---|
| | 300 μm | 212 μm | 150 μm | 106 μm | 75 μm | 53 μm | −53 μm |
| | (Change in percent of material retained on screen between 5 and 20 minute shaking) | | | | | | |
| Example 1 | −19.7 | −25.2 | −17.8 | −0.6 | 1.2 | 0.6 | 61.4 |
| Example 2 | −2.9 | −0.7 | 1.1 | 0.9 | 0.3 | 0.1 | 1.2 |
| Example 3 | −16.9 | −16.4 | 9.2 | 4.6 | 1.9 | 1.0 | 16.6 |
| Example 4 | −1.7 | −1.2 | 0.8 | 1.2 | 0.4 | 0.2 | 0.4 |
| Example 5 | −2.2 | −.1 | 0.5 | 0.7 | 0.1 | 0.2 | 0.9 |
| Example 6 | −2.3 | 0.3 | 0.8 | 0.4 | 0.1 | 0.3 | 0.5 |
| Example 7 | −36.0 | −28.7 | −14.0 | 11.4 | −0.1 | 1.3 | 66.1 |
| Example 8 | −7.5 | 1.4 | 2.2 | 1.1 | 0.6 | 0.4 | 1.7 |
| Example 9 | −1.4 | −0.9 | 0.5 | 0.6 | 0.2 | −0.1 | 1.2 |
| Example 10 | −0.6 | −0.4 | 0.2 | 0.1 | 0.1 | 0.2 | 0.4 |
| Example 11 | −5.3 | 0.9 | 1.6 | 0.8 | 0.2 | 0.1 | 1.7 |
| SGA1 | −0.1 | −0.1 | −0.5 | −0.5 | −0.4 | 0 | 1.7 |
| SGA 2 | 0 | 0 | −0.5 | −1.1 | 1.0 | 0 | 0.7 |

Of particular interest is the increase in the finest portion of the measured particle size distribution (53 μm) and we can see that the micro agglomerates produced in examples 2, 4, 5, 6, 8 and 9 are of comparable attrition resistance to smelting grade alumina. Examples 10 and 11 demonstrated acceptable attrition resistance.

Table 5, below, shows the results of the attrition testing for micro agglomerates which have been calcined to 500° C.

TABLE 5

| | \multicolumn{7}{c}{Screen size} | | | | | | |
|---|---|---|---|---|---|---|---|
| | 300 μm | 212 μm | 150 μm | 106 μm | 75 μm | 53 μm | −53 μm |
| | \multicolumn{7}{c}{(Change in percent of material retained on screen between 5 and 20 minute shaking)} | | | | | | |
| Example 2 | −6.6 | 1.0 | 2.1 | 1.2 | 0.6 | 0.3 | 1.4 |
| Example 4 | −1.8 | −1.3 | 0.9 | 1.2 | 0.4 | 0.2 | 0.4 |
| Example 5 | −9.4 | −4.1 | 3.3 | 4.1 | 1.0 | 1.0 | 4.0 |
| Example 6 | −10.9 | 3.1 | 3.6 | 1.4 | 0.8 | 0.3 | 1.7 |
| Example 8 | −15.8 | 4.8 | 4.6 | 2.1 | 0.9 | 0.8 | 2.7 |
| Example 9 | −5.8 | −1.6 | 2.5 | 2.0 | 1.0 | 0.4 | 1.5 |
| Example 10 | −2.0 | −0.6 | 0.8 | 0.9 | 0.3 | 0.1 | 0.5 |
| Example 11 | −5.9 | −19.4 | −9.8 | 11.5 | 3.3 | 2.5 | 17.8 |
| SGA1 | −0.1 | −0.1 | −0.5 | −0.5 | −0.4 | 0 | 1.7 |
| SGA 2 | 0 | 0 | −0.5 | −1.1 | 1.0 | 0 | 0.7 |

Calcination to 500° C. dehydroxylates any gibbsite which may be present in the dust, and the added pseudo-boehmite. Attrition resistance remains generally acceptable. Whilst demonstrating acceptable attrition resistance down to the 2% binder level before calcination, Examples 10 and 11 showed unsatisfactory attrition resistance below 4% binder concentration after calcination. In Examples 10 and 11 the alumina particles were peptised at 20° C.

Another set of experiments demonstrated the effect of comminuting alumina particles before they are combined with a binder. ESP dust was collected and milled in a Hosokawa Alpine Jet Mill. The analysis of the treated ESP dust appears in Table 6 below.

TABLE 6

| | % $Na_2O$ | $D_{10}$ | $D_{50}$ | $D_{90}$ | % Loss to 105° C. | % Loss 105-300° C. | % Loss 300-950° C. | Total % loss |
|---|---|---|---|---|---|---|---|---|
| As Collected | 0.61 | 3.7 | 13.9 | 35.6 | | | | |
| As Treated | 0.27 | 2.0 | 3.0 | 5.7 | 1.17 | 16.04 | 4.05 | 21.26 |

A slurry of water, poly aluminum hydroxy chloride (PAC) binder and the treated ESP dust was prepreated to a solids density of approximately 50%. The slurry was then spray dried to form micro agglomerates under the conditions set out in Table 7 below.

TABLE 7

| % PAC | pH | Spray Dryer Exhaust Temperature, ° C. |
|---|---|---|
| 10 | 3.8 | 138.5 |
| 7 | 4.2 | 130 |
| 5 | 5.1 | 130 |
| 4 | 5.5 | 145 |
| 3 | 5.3 | 145 |
| 2 | 6.2 | 145 |

Six runs were conducted at different PAC addition levels. Agglomeration was noted in all cases. Particle size distribution analyses were conducted on the micro agglomerates. The particle size distribution (by screening) of the product is shown in Table 8 below.

TABLE 8

| | \multicolumn{6}{c}{Cumulative % passing size} | | | | | |
|---|---|---|---|---|---|---|
| | 1000 μm | 500 μm | 300 μm | 212 μm | 106 μm | 45 μm |
| 10% PAC | 100 | 95.3 | 90.2 | 80.5 | 33.5 | 2.8 |
| 7% PAC | 100 | 95.3 | 89.0 | 80.1 | 31.8 | 2.4 |
| 5% PAC | 100 | 96.5 | 89.0 | 72.4 | 24.6 | 1.6 |
| 4% PAC | 100 | 95.8 | 84.0 | 62.3 | 20.2 | 1.1 |

TABLE 8-continued

| | \multicolumn{6}{c}{Cumulative % passing size} | | | | | |
|---|---|---|---|---|---|---|
| | 1000 μm | 500 μm | 300 μm | 212 μm | 106 μm | 45 μm |
| 3% PAC | 100 | 89.5 | 78.4 | 59.1 | 19.3 | 0.9 |
| 2% PAC | 100 | 89.3 | 71.9 | 75.7 | 5.2 | 0.2 |

As can be seen, the product micro agglomerates are similar to the desired smelting grade alumina sizing.

The micro agglomerates produced were tested for strength using an attrition test wherein 10 g of micro agglomerate was placed on the top screen in a stack on a Rop Tap, shaker and the shaker was activated for 5 minutes. A separate sample was placed on the shaker for 20 minutes. The difference in particle size distribution was used as a comparative breakage test for the samples. The results of the attrition test conducted on agglomerates formed with 7% PAC appear in Table 9 below.

TABLE 9

| Size (mic) | Not Calcined | | | 600° C. Time | | | 900° | | |
|---|---|---|---|---|---|---|---|---|---|
| | 5 min. | 20 min. | delta | 5 min. | 20 min. | delta | 5 min. | 20 min | delta |
| | | | | % Retained | | | | | |
| +300 | 6.47 | 4.44 | −2.03 | 4.44 | 2.11 | −2.33 | 3.91 | 1.58 | −2.33 |
| −300/+212 | 9.88 | 10.55 | 0.67 | 9.11 | 9.03 | −0.08 | 11.04 | 10.02 | −1.02 |
| −212/+150 | 23.42 | 23.92 | 0.49 | 23.36 | 23.44 | 0.07 | 26.15 | 26.50 | 0.34 |
| −150/+106 | 26.75 | 27.01 | 0.27 | 29.00 | 28.30 | −0.70 | 29.27 | 30.15 | 0.88 |
| −106/+75 | 16.64 | 16.79 | 0.15 | 17.39 | 18.29 | 0.90 | 16.41 | 17.26 | 0.84 |
| −75/+53 | 9.29 | 8.94 | −0.36 | 9.13 | 9.52 | 0.39 | 7.81 | 7.94 | 0.13 |
| −53 | 7.54 | 8.35 | 0.81 | 7.57 | 9.31 | 1.74 | 5.40 | 6.56 | 1.16 |

The results of the attrition tests conducted on agglomerates formed with 5% PAC appear in Table 10 below.

TABLE 10

| Size (mic) | Not Calcined | | | 600° C. Time | | | 900° C. | | |
|---|---|---|---|---|---|---|---|---|---|
| | 5 min. | 20 min. | delta | 5 min. | 20 min. | delta | 5 min. | 20 min. | delta |
| | | | | % Retained | | | | | |
| +300 | 7.67 | 4.99 | −2.69 | 2.02 | 0.19 | −1.83 | 1.65 | 0.18 | −1.47 |
| −300/+212 | 15.74 | 16.71 | 0.97 | 14.56 | 10.32 | −4.24 | 15.13 | 4.50 | −10.63 |
| −212/+150 | 25.92 | 26.65 | 0.73 | 26.35 | 29.14 | 2.80 | 26.92 | 33.93 | 7.01 |
| −150/+106 | 24.78 | 25.14 | 0.36 | 27.03 | 28.33 | 1.30 | 26.86 | 29.13 | 2.27 |
| −106/+75 | 13.96 | 13.93 | −0.03 | 15.55 | 16.02 | 0.47 | 15.54 | 16.24 | 0.70 |
| −75/+53 | 7.18 | 7.08 | −0.10 | 8.44 | 8.48 | 0.04 | 8.03 | 8.42 | 0.39 |
| −53 | 4.74 | 5.50 | 0.77 | 6.05 | 7.51 | 1.47 | 5.89 | 7.62 | 1.73 |

The results of the attrition tests conducted on agglomerates formed with 3% PAC appear in Table 11 below.

TABLE 11

| Size (mic) | Not Calcined Time | | |
|---|---|---|---|
| | 5 min. | 20 min. | delta |
| | | % Retained | |
| +300 | 19.34 | 8.87 | −10.47 |
| −300/+212 | 19.77 | 21.66 | 1.90 |
| −212/+150 | 22.16 | 27.33 | 5.17 |
| −150/+106 | 21.43 | 23.57 | 2.14 |
| −106/+75 | 9.46 | 9.60 | 0.14 |
| −75/+53 | 5.46 | 5.61 | 0.14 |
| −53 | 2.38 | 3.36 | 0.98 |

The results of the attrition tests conducted on agglomerates formed with 10% PAC appear in Table 12 below.

TABLE 12

| Size (mic) | Not Calcined | | | 600° C. Time | | | 900° C. | | |
|---|---|---|---|---|---|---|---|---|---|
| | 5 min. | 20 min. | Delta | 5 min. | 20 min. | delta | 5 min. | 20 min. | delta |
| | | | | % Retained | | | | | |
| +300 | 6.05 | 4.82 | −1.23 | 4.34 | 2.37 | −2.00 | 3.38 | 1.36 | −2.02 |
| −300/+212 | 11.40 | 8.78 | −2.62 | 7.81 | 7.53 | −0.29 | 7.65 | 7.24 | −0.41 |
| −212/+150 | 19.92 | 20.86 | 0.94 | 19.14 | 19.39 | 0.25 | 18.62 | 18.98 | 0.36 |
| −150/+106 | 26.23 | 27.20 | 0.97 | 28.06 | 28.11 | 0.04 | 27.24 | 27.79 | 0.56 |
| −106/+75 | 17.39 | 18.05 | 0.66 | 19.31 | 19.49 | 0.18 | 19.25 | 19.69 | 0.43 |
| −75/+53 | 10.30 | 10.21 | −0.09 | 10.88 | 11.11 | 0.23 | 11.84 | 11.69 | −0.15 |
| −53 | 8.71 | 10.07 | 1.36 | 10.46 | 12.01 | 1.55 | 12.02 | 13.25 | 1.23 |

The results of the attrition tests conducted on agglomerates formed with 4% PAC appear in Table 13 below.

TABLE 13

| Size (mic) | Not Calcined | | | 600° C. Time | | | 900° C. | | |
| --- | --- | --- | --- | --- | --- | --- | --- | --- | --- |
| | 5 min. | 20 min. | delta | 5 min. | 20 min. | delta | 5 min. | 20 min. | Delta |
| | | | | % Retained | | | | | |
| +300 | 13.02 | 10.72 | −2.30 | 5.25 | 0.20 | −5.05 | 2.938 | 0.24 | −2.70 |
| −300/+212 | 22.13 | 23.06 | 0.93 | 24.28 | 14.42 | −9.86 | 27.37 | 11.24 | −13.13 |
| −212/+150 | 23.47 | 23.92 | 0.45 | 24.92 | 33.95 | 9.02 | 26.18 | 36.16 | 9.98 |
| −150/+106 | 21.91 | 22.18 | 0.27 | 23.00 | 25.98 | 2.98 | 23.92 | 26.85 | 2.93 |
| −106/+75 | 10.53 | 10.25 | −0.28 | 11.70 | 11.10 | −0.60 | 11.34 | 11.06 | −0.28 |
| −75/+53 | 5.73 | 5.89 | 0.15 | 5.69 | 6.16 | 0.47 | 5.91 | 5.80 | −0.12 |
| −53 | 3.20 | 3.98 | 0.78 | 5.16 | 8.19 | 3.03 | 5.33 | 8.66 | 3.33 |

The results of the attrition tests conducted on agglomerates formed with 2% PAC appear in Table 14 below.

TABLE 14

| Size (microns) | Not Calcined Time | | |
| --- | --- | --- | --- |
| | 5 min. | 20 min. | delta |
| | % Retained | | |
| +300 | 19.65 | 11.52 | −8.13 |
| −300/+212 | 30.03 | 18.13 | −11.90 |
| −212/+150 | 24.81 | 29.85 | 5.04 |
| −150/+106 | 14.64 | 23.52 | 8.87 |
| −106/+75 | 4.81 | 4.80 | −0.01 |
| −75/+53 | 3.72 | 7.01 | 3.29 |
| −53 | 2.32 | 5.17 | 2.85 |

The results were compared to micro agglomerates formed using unground ESP and 10% PAC. The results of the attrition tests conducted on agglomerates formed with 10% PAC and unground ESP dust appear in Table 15 below.

TABLE 15

| Size (mic) | Not Calcined | | | 600° C. Time | | | 900° C. | | |
| --- | --- | --- | --- | --- | --- | --- | --- | --- | --- |
| | 5 min. | 20 min. | delta | 5 min. | 20 min. | delta | 5 min. | 20 min. | delta |
| | | | | % Retained | | | | | |
| +300 | 4.12 | 3.26 | −0.86 | 0.82 | 0.49 | −0.33 | 0.79 | 0.29 | −0.50 |
| −300/+212 | 6.17 | 6.01 | −0.16 | 6.16 | 5.07 | −1.09 | 5.84 | 4.43 | −1.41 |
| −212/+150 | 15.64 | 15.84 | 0.19 | 16.11 | 15.83 | −0.27 | 15.84 | 15.62 | −0.23 |
| −150/+106 | 25.57 | 25.45 | −0.12 | 28.62 | 28.90 | 0.28 | 29.15 | 29.64 | 0.49 |
| −106/+75 | 20.44 | 20.51 | 0.068 | 24.27 | 24.19 | −0.08 | 23.99 | 24.27 | 0.28 |
| −75/+53 | 13.61 | 13.13 | −0.48 | 15.91 | 15.34 | −0.57 | 15.90 | 15.22 | −0.68 |
| −53 | 14.43 | 15.8 | 1.37 | 8.10 | 10.17 | 2.07 | 8.49 | 10.54 | 2.05 |

The results were compared to the attrition behavior of a typical smelting grade alumina. Results of the attrition test conducted on a typical smelting grade alumina appear in Table 16 below.

TABLE 16

| Size Range, microns | Attrition Time, (min) | | |
| --- | --- | --- | --- |
| | 5 min. | 20 min. | Delta |
| | % Retained | | |
| +300 | 0.15 | 0.02 | −0.13 |
| −300/+212 | 0.13 | 0.00 | −0.13 |
| −212/+150 | 4.48 | 3.94 | −0.54 |
| −150/+106 | 25.15 | 24.67 | −0.48 |
| −106/+75 | 35.33 | 34.92 | −0.41 |
| −75/+53 | 20.96 | 20.97 | 0.00 |
| −53 | 13.80 | 15.48 | 1.68 |
| | 100.00 | 100.00 | |

The results demonstrate that before calcination, the products of mixes containing greater than 4% PAC binder have comparable resistance to the product of the unground ESP with 10% PAC binder. After heating to 600° C., there is more breakage of coarse particles at the 5% PAC level, and considerably more at the 4% PAC level. Most of this material goes into the 106 to 212 μm range and there is only a small increase in the smallest fraction measured. After heating to 900° C., there is much more breakage from the coarse fractions of the 4% PAC and 5% PAC samples than the product of the unground ESP. Again, most of this material goes into the 106 to 212 μm range and there is only a small increase in the smallest fraction measured.

From the preceding results, it can be seen that the method of the present invention is highly effective at agglomerating alumina particles into micro-agglomerates of appropriate size and resistance to attrition to be incorporated into smelting grade alumina. This is achieved using levels of binder much lower than that utilized in the prior art, affording cost savings and industrial hygiene benefits.

The pseudo-boehmite range between about 0.8 wt % and 5 wt % based on weight of the mixture is ideal because about 0.8 wt % represents the approximate lower effective limit of the binder while about 5 wt % represents the approximate upper economic limit of the pseudo-boehmite binder.

It is envisaged that a catalyst metal may be added to the slurry to produce a high surface area catalyst product on an alumina binder.

Modifications and variations such as would be apparent to the skilled addressee are considered to fall within the scope of the present invention.

What is claimed is:

1. A method for the agglomeration of alumina particles, the method characterized by the steps of:
   comminuting a plurality of alumina particles having a soda content of less than approximately 0.4% by weight to a $D_{50}$ of less than 12 μm;
   adding a quantity of pseudo-boehmite as an aqueous suspension having a pH of from about 2 to 6 to said plurality of alumina particles to form a mixture such that the quantity of pseudo-boehmite is between about 0.8 wt% and 5 wt% based on weight of said mixture; and
   spray drying said mixture to produce agglomerated granules.

2. A method according to claim 1 in that said pseudo-boehmite suspension is formed at a temperature between about 15 and 100° C.

3. A method according to claim 1 in that said pseudo-boehmite suspension is formed at a temperature above about 80° C.

4. A method according to claim 1 in that said pseudo-boehmite suspension is formed at a temperature above about 85° C.

5. A method according to claim 1 such that the pH of said pseudo-boehmite suspension is approximately 3.

6. A method according to claim 1 in that a quantity of monoprotic acid is added to said pseudo-boehmite suspension such that the pH of said pseudo-boehmite suspension is between about 2 and 6.

7. A method according to claim 1 in that a quantity of acetic acid is added to said pseudo-boehmite suspension such that the pH of said pseudo-boehmite suspension is between about 2 and 6.

8. A method according to claim 1 in that before the step of adding a quantity of said pseudo-boehmite to said alumina particles, said alumina particles are comminuted to a $D_{50}$ of less than about 9 μm.

9. A method according to claim 1 in that before the step of adding a quantity of said pseudo-boehmite to said alumina particles, said alumina particles are comminuted to a $D_{50}$ of less than about 5 μm.

10. A method according to claim 1 characterized in that before said quantity of pseudo-boehmite is added to said alumina particles, the method comprises the additional steps of neutralizing, dewatering and washing said alumina particles.

11. A method according to 10 characterized in that carbon dioxide neutralizes said alumina particles.

12. A method according to 10 characterized in that the step of neutralizing, dewatering and washing said alumina particles is carried out before grinding said alumina particles.

13. A method according to claim 1 characterized by the step of heating said agglomerated granules.

14. A method according to claim 13 characterized in that said agglomerated particles are dehydroxylated by heating to approximately 300° C.

15. A method according to claim 13 characterized in that said agglomerated granules are calcined above 500° C.

16. A method according to claim 1 wherein said agglomerated granules have a $D_{50}$ in the range of about 150 to 300 μm.

17. A method according to claim 1 wherein said plurality of alumina particles has a soda content of less than approximately 0.35% by weight.

18. A method according to claim 1 wherein said plurality of alumina particles has a soda content of less than approximately 0.30% by weight.

19. A method according to claim 1 wherein said plurality of alumina particles has a soda content of less than approximately 0.25% by weight.

20. A method for the agglomeration of alumina particles, the method characterized by the steps of:
   adding a quantity of water to a plurality of alumina particles having a soda content of less than approximately 0.4% by weight to form a slurry;
   grinding said alumina particles in said slurry to a $D_{50}$ of less than 12 μm;
   adding a quantity of pseudo-boehmite as an aqueous suspension having a pH of from about 2 to 6 to said slurry to form a mixture such that the quantity of said pseudo-boehmite is between about 0.8 wt% and 5 wt% based on weight of said mixture; adding a viscosity modifier to said slurry, said mixture or said aqueous suspension such that the viscosity of said mixture is less than about 4 cp; and
   spray drying said mixture to produce agglomerated granules.

21. A method according to claim 20 where said viscosity modifier is acetic acid and the concentration of said acetic acid in said slurry is between about 0.2 and 1.5% by weight of said alumina particles.

22. A method according to claim 20 wherein said plurality of alumina particles has a soda content of less than approximately 0.35% by weight.

23. A method according to claim 20 wherein said plurality of alumina particles has a soda content of less than approximately 0.30% by weight.

24. A method according to claim 20 wherein said plurality of alumina particles has a soda content of less than approximately 0.25% by weight.

25. A method according to claim 20 where said viscosity modifier containing one or more acetic acid, citric acid or a polyacrylate.

26. A method according to claim 20 where said slurry is of a high density.

27. A method according to claim 20 in that said slurry comprises at least about 50% solids.

28. A method according to claim 20 in that said slurry comprises between about 40 and 60% solids.

29. A method according to claim 20 in that said pseudo-boehmite suspension is formed at a temperature between about 15 and 100° C.

30. A method according to claim 20 in that said pseudo-boehmite suspension is formed at a temperature above about 80° C.

31. A method according to claim 20 in that said pseudo-boebmite suspension is formed at a temperature above about 85° C.

32. A method according to claim 20 such that the pH of said pseudo-boebmite suspension is approximately 3.

33. A method according to claim 20 in that a quantity of monoprotic acid is added to said pseudo-boehmite suspension such that the pH of said pseudo-boehmite suspension is between about 2 and 6.

34. A method according to claim 20 in that a quantity of acetic acid is added to said pseudo-boehmite suspension such that the pH of said pseudo-boehmite suspension is between about 2 and 6.

35. A method according to claim 34 wherein the step of adding a quantity of acetic acid to said pseudo-boehmite suspension such that the pH of said pseudo-boehmite suspension is between about 2 and 6 and the step of adding a viscosity modifier to said slurry, said mixture or said aqueous suspension such that the viscosity of said mixture is less than about 4 cp are performed concurrently by the addition of a single quantity of acetic acid to said aqueous suspension.

36. A method according to claim 20 in that before the step of adding a quantity of said pseudo-boehmite to said alumina particles, said alumina particles are comminuted to a $D_{50}$ of less than about 9 μm.

37. A method according to claim 20 in that before the step of adding a quantity of said pseudo-boehmite to said alumina particles, said alumina particles are comminuted to a $D_{50}$ of less than about 5 μm.

38. A method according to claim 20 characterized in that before said quantity of pseudo-boehmite is added to said alumina particles, the method comprises the additional steps of neutralizing, dewatering and washing said alumina particles.

39. A method according to claim 38 characterized in that dewatering is achieved by way of filtration.

40. A method according to claim 38 characterized in that dewatering is achieved by way of centrifugation.

41. A method according to claim 39 characterized in that carbon dioxide neutralizes said alumina particles.

42. A method according to 38 characterized in that the step of neutralizing, dewatering and washing said alumina particles is carried out before grinding said alumina particles.

43. A method according to claim 20 characterized by the step of heating said agglomerated granules.

44. A method according to claim 43 characterized in that said agglomerated particles are dehydroxylated by heating to approximately 300° C.

45. A method according to claim 43 characterized in that said agglomerated granules are calcined above 500° C.

46. A method according to claim 20 wherein said agglomerated granules have a $D_{50}$ in the range of about 150 to 300 μm.

47. A method for the agglomeration of alumina particles, the method characterized by the steps of:
grinding a plurality of alumina particles having a soda content of less than approximately 0.4% by weight to a $D_{50}$ of less than 12 μm;
adding a quantity of water to said alumina particles to form a slurry;
adding a quantity of pseudo-boebmite as an aqueous suspension having a pH of from about 2 to 6 to said slurry to form a mixture such that the quantity of said pseudo-boehmite is between about 0.8 wt% and 5 wt% based on weight of said mixture; and
adding a viscosity modifier to said slurry, said mixture or said aqueous suspension such that the viscosity of said mixture is less than about 4 cp;
spray drying said mixture to produce agglomerated granules.

48. A method according to claim 47 where said viscosity modifier is acetic acid and the concentration of said acetic acid in said slurry is between about 0.2 and 1.5% by weight of said alumina particles.

49. A method according to claim 47 wherein said plurality of alumina particles has a soda content of less than approximately 0.35% by weight.

50. A method according to claim 47 wherein said plurality of alumina particles has a soda content of less than approximately 0.30% by weight.

51. A method according to claim 47 wherein said plurality of alumina particles has a soda content of less than approximately 0.25% by weight.

52. A method according to claim 47 where said viscosity modifier containing one or more acetic acid, citric acid or a polyacrylate.

53. A method according to claim 47 where said slurry is of a high density.

54. A method according to claim 47 in that said slurry comprises at least about 50% solids.

55. A method according to claim 47 in that said slurry comprises between about 40 and 60% solids.

56. A method according to claim 47 in that said pseudo-boehmite suspension is formed at a temperature between about 15 and 100° C.

57. A method according to claim 47 in that said pseudo-boehmite suspension is formed at a temperature above about 80° C.

58. A method according to claim 47 in that said pseudo-boehmite suspension is formed at a temperature above about 85° C.

59. A method according to claim 47 such that the pH of said pseudo-boehmite suspension is approximately 3.

60. A method according to claim 47 in that a quantity of monoprotic acid is added to said pseudo-boehmite suspension such that the pH of said pseudo-boebmite suspension is between about 2 and 6.

61. A method according to claim 47 in that a quantity of acetic acid is added to said pseudo-boehmite suspension such that the pH of said pseudo-boebmite suspension is between about 2 and 6.

62. A method according to claim 61 wherein the step of adding a quantity of acetic acid to said pseudo-boehmite suspension such that the pH of said pseudo-boehmite suspension is between about 2 and 6 and the step of adding a viscosity modifier to said slurry, said mixture or said aqueous suspension such that the viscosity of said mixture is less than about 4 cp are performed concurrently by the addition of a single quantity of acetic acid to said aqueous suspension.

63. A method according to claim 47 in that before the step of adding a quantity of said pseudo-boebmite to said alumina particles, said alumina particles are comminuted to a $D_{50}$ of less than about 9 μm.

64. A method according to claim 47 in that before the step of adding a quantity of said pseudo-boehmite to said alumina particles, said alumina particles are comminuted to a $D_{50}$ of less than about 5 μm.

65. A method according to claim 47 characterized in that before said quantity of pseudo-boehmite is added to said alumina particles, the method comprises the additional steps of neutralizing, dewatering and washing said alumina particles.

66. A method according to claim 65 characterized in that carbon dioxide neutralizes said alumina particles.

67. A method according to claim 65 characterized in that the step of neutralizing, dewatering and washing said alumina particles is carried out before grinding said alumina particles.

68. A method according to claim 47 characterized by the step of heating said agglomerated granules.

69. A method according to claim 68 characterized in that said agglomerated particles are dehydroxylated by heating to approximately 300° C.

70. A method according to claim 68 characterized in that said agglomerated granules are calcined above 500° C.

71. A method according to claim 47 wherein said agglomerated granules have a $D_{50}$ in the range of about 150 to 300 μm.

72. A method according to claim 45 wherein said quantity of water is provided in the form of said aqueous suspension.

* * * * *